United States Patent [19]
Ohta

[11] Patent Number: 4,888,761
[45] Date of Patent: Dec. 19, 1989

[54] DISK CARTRIDGE

[75] Inventor: Teruo Ohta, Miyagi, Japan

[73] Assignee: Sony Corporation, Tokyo, Japan

[21] Appl. No.: 172,543

[22] PCT Filed: Jul. 3, 1987

[86] PCT No.: PCT/JP87/00470

§ 371 Date: Feb. 25, 1988

§ 102(e) Date: Feb. 25, 1988

[87] PCT Pub. No.: WO88/00385

PCT Pub. Date: Jan. 14, 1988

[30] Foreign Application Priority Data

Jul. 4, 1986 [JP] Japan ............................ 61-102707
Sep. 16, 1986 [JP] Japan ............................ 61-217531

[51] Int. Cl.$^4$ ............................................ G11B 23/03
[52] U.S. Cl. .................................... 369/291; 360/133; 206/309; 206/312
[58] Field of Search .............. 369/270, 271, 282, 289, 369/290, 291, 292; 360/133; 206/309, 312, 444

[56] References Cited

U.S. PATENT DOCUMENTS

| 3,609,722 | 9/1971 | Zenzefilis. | |
|---|---|---|---|
| 4,433,410 | 2/1984 | Siryj et al. | |
| 4,620,247 | 10/1986 | Papciak et al. | 360/133 |
| 4,646,193 | 2/1987 | Gitzendanner | 360/133 |
| 4,660,118 | 4/1987 | Faber | 369/291 |
| 4,661,875 | 7/1987 | Kinjo | 360/133 |
| 4,680,662 | 7/1987 | Fukushira et al. | 369/291 |

FOREIGN PATENT DOCUMENTS

| 142411 | 10/1984 | European Pat. Off. . |
|---|---|---|
| 174651 | 9/1985 | European Pat. Off. . |
| 61-982(A) | 1/1986 | Japan. |
| 104380 | 5/1986 | Japan. |
| 165871 | 7/1986 | Japan. |
| 65279 | 3/1987 | Japan. |
| 61075 | 4/1987 | Japan. |
| 554710(A) | 1/1989 | Japan. |

Primary Examiner—Steven L. Stephan
Attorney, Agent, or Firm—Philip M. Shaw, Jr.

[57] ABSTRACT

A disk cartridge (4) formed of a pair of cartridge halves (1) and (2) in which a recording and reproducing disk (5) is rotatably accommodated is characterized in that a plurality of supporting members (25), (26) or (35), (36) made of silicone rubber are fixed to the inner surfaces of the cartridge halves (1) and (2) so as to correspond to non-signal recorded portions on the inner and outer peripheries of the disk, wherein upon non-use of the disk, it is supported by the supporting members on any one of the cartridge halves.

9 Claims, 6 Drawing Sheets

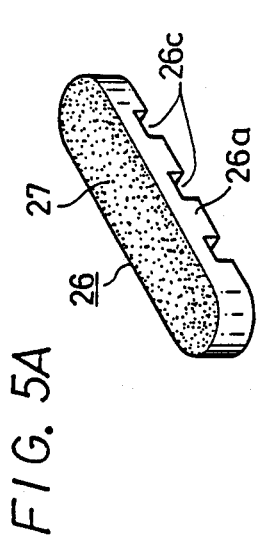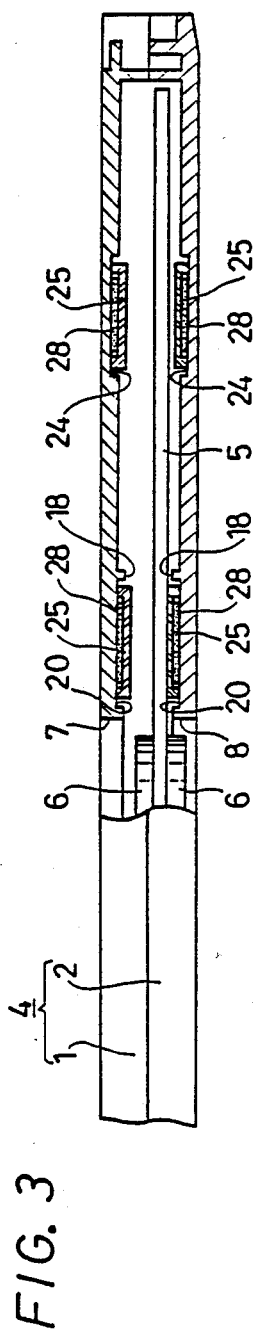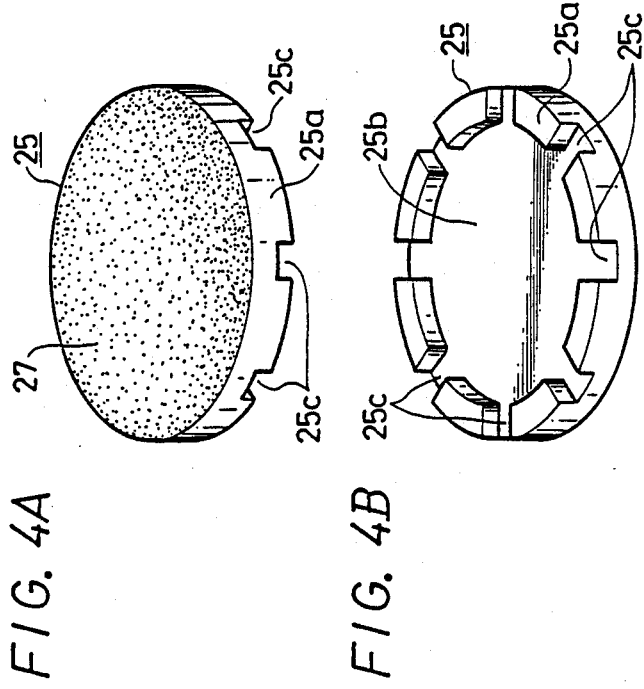

DISK CARTRIDGE

TECHNICAL FIELD

The present invention relates to a disk cartridge in which a disk such as a WRITE ONCE optical disk or the like is accommodated to be freey rotatable.

BACKGROUND ART

A known disk such as a WRITE ONCE optical disk is accommodated in a predetermined cartridge in order to protect an information signal from write error and read error caused by smudges due to dust upon non-use when it is not loaded onto a recording and/or reproducing apparatus or due to damage caused when it contacts with a foreign object. This kind of cartridge is disclosed in Japanese Published Patent Gazette No. 61-3015, in which opening portions are formed through upper and lower halves of the disk cartridge in order to expose one portion of a signal recorded portion of the disk accommodated in the disk cartridge and a chucking portion provided at the center of the rotation thereof. Also, in order to prevent at least the signal recorded portion of the disc from contacting with the inner wall of the disk cartridge, disk supporting ribs are protrusively formed within the cartridge. These ribs support the disk at its portion where no signal is recorded.

Of the thus arranged conventional disk cartridges, particularly the disk cartridge where the disk is supported by the integrally formed ribs, the cartridge nevertheless cannot protect the disk from being physically shocked. Thus, if the disk cartridge is subjected to physical shock during its transportation or the like, the disk will be damaged. If a flexible shock absorbing member such as a rubber plate is provided on the inner surface of the cartridge and this shock absorbing member supports the disk, the disk can be protected from the damage caused by the shock. When the weight of the disk is applied to the shock absorbing member, however, the shock absorbing member is bent so that the disk sticks to the shock adsorbing member. Thus, when the disk cartridge is loaded on and rotated by the recording and/or reproducing apparatus, there is then a risk that the disk cannot begin to rotate smoothly. Particularly when the shock absorbing member is made of silicone rubber with sufficient flexibility in order to enhance the shock absorbing effect, the disk sticks to the shock absorbing member noticeably.

DISCLOSURE OF INVENTION

The present invention is to provide a disk cartridge which can prevent a disk from sticking to a disk supporting member even when the disk supporting member is made of material such as silicone rubber or the like with sufficient flexibility and high shock absorbing effect in order to support the disk within the disk cartridge. Also, when the disk cartridge is loaded on and rotated by a recording and/or reproducing apparatus, the disk can begin to rotate smoothly and the disk supporting member can be fixed positively and stably.

According to an example of the present invention, there is provided a disk cartridge in which a disk 5 on which an information signal is recorded is rotatably accommodated within a cartridge 4. Disk supporting members 25, 26 or 35, 36 have a sticking preventing portion 27 or 37 formed on their disk supporting surface sides and are fixed to the inner wall of the cartridge 4 at its portions corresponding to non-signal recorded portions of the inner and outer peripheral portions of the disk 5 by bonding or calking. The disk 5 is supported by the disk supporting members 25, 26 or 35, 36.

According to the present invention, since the disk 5 is supported by the disk supporting members 25, 26 or 35, 36 having the sticking preventing portion 27 or 37 formed on their disk supporting side, the disk 5 can be effectively protected from the damage caused by the shock. Also, even if the disk supporting members 25, 26 or 35, 36 are bent by the weight of the disk 5, the sticking preventing portion 27 or 37 can prevent the disk from sticking to the disk supporting members. Further, the disk supporting members 25, 26 or 35, 36 can be bonded to the inner wall of the cartridge 4 without shedding extra adhesive agent or they are stably fixed thereto by calking.

BRIEF DESCRIPTION OF DRAWINGS

FIG. 3 is a partially enlarged cross-sectional view of the disk cartridge, FIG. 4 illustrates a circular disk supporting member used in the present invention, in which FIG. 4A is an upper perspective view thereof and FIG. 4B is a lower perspective view thereof, FIG. 5 illustrates a rectangular disk supporting member used in the invention, in which FIG. 5A is an upper perspective view thereof and FIG. 5B is a lower perspective view thereof, FIG. 11 illustrates a further example of the circular disk supporting member used in the present invention, in which FIG. 12 illustrates a further example of the rectangular disk supporting member used in the present invention, in which

BEST MODE FOR CARRYING OUT THE INVENTION

An embodiment of a disk cartridge according to the present invention will hereinafter be described with reference to FIGS. 1 to 7.

Figure 1:
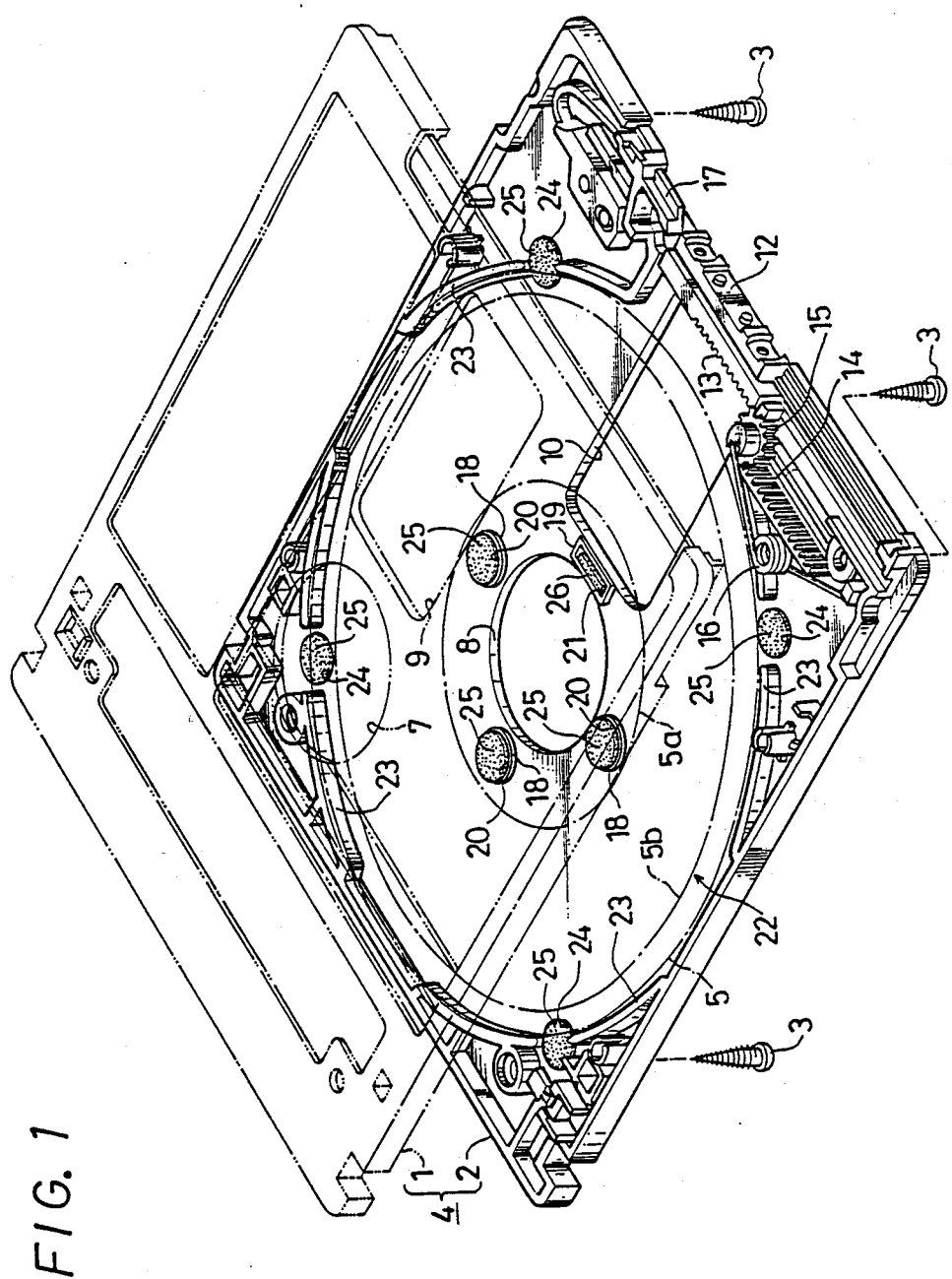
FIG. 1 is a perspective view illustrating a disk cartridge of the present invention through a lower half forming a disk cartridge.
Figure 2:
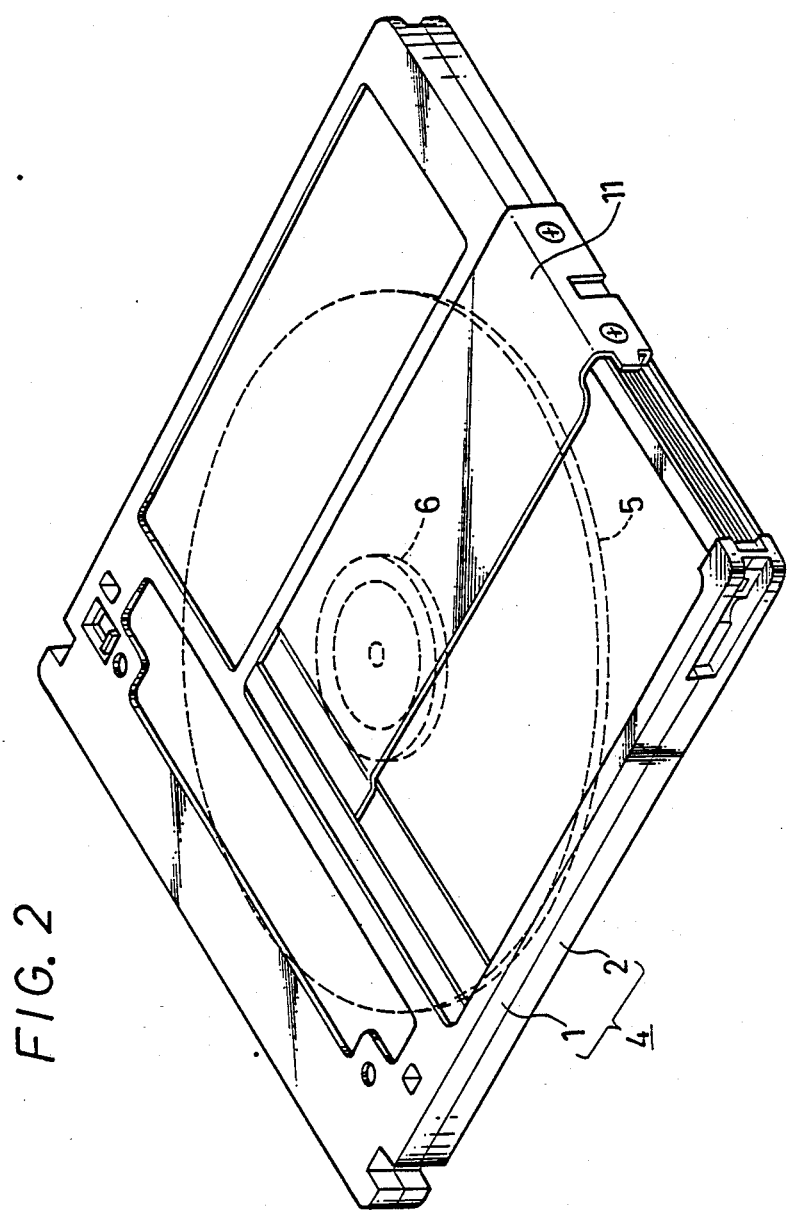
FIG. 2 is an overall perspective view of the disk cartridge.

A disk cartridge according to this invention is arranged such that as shown in FIGS. 1 and 2, a disk-shaped disk 5 such as a WRITE ONCE optical disk or the like is rotatably accommodated within a cartridge 4 that is formed by abutting and fixing rectangular upper half 2 and lower half 3 by a plurality of screws 3. Chucking mechanism insertion openings 7 and 8 are respectively formed through the central portions of the upper half 2 and the lower half 3 that form the cartridge 4 so as to expose a chucking hub 6 provided at the central portion of the disk 5 accommodated therein. Opening portions 9 and 10 are formed through the upper and lower halves in the direction toward the front edges thereof with a predetermined distance from the insertion openings 7 and 8, thus exposing the signal recorded portion of the disk 5 to the outside along its diametrical direction and facing to an external information signal writing and reading means (not shown) such as an optical pickup or the like for writing a predetermined information signal on the disk 5 and for reading the recorded information signal therefrom.

The cartridge 4 is provided with a slide shutter 11 that opens and closes the chucking mechanism insertion openings 7, 8 and the opening portions 9, 10. The shutter 11 is formed by bending a metal plate such as a thin stainless steel plate or the like in a U-shaped fashion. This shutter is engaged with the outer side wall of the cartridge 4, fixed to a slide base 12 which is engaged in such a manner that it is slidable between the front edge portions of the cartridge 4 and in lateral direction, and then slidably attached to the cartridge together with the slide base 12 in the direction in which it opens and closes the chucking mechanism insertion openings 7, 8 and the opening portions 9, 10. The slide base 12 having the shutter 11 fixed thereto is spring-biased by a torsion spring 16 through an interlocking mechanism formed of a first rack gear 13 formed on one inner side wall of the slide base 12, a second rack gear 14 formed on the lower half 2 and a pinion gear 15 rotatably engaged between these rack gears 13 and 14 in such a manner that the shutter 11 normally closes the chucking mechanism insertion openings 7, 8 and the opening portions 9, 10.

The lower half 2 forming the cartridge 4 has a locking member 17 mounted to the position corresponding to the closed end portion of the shutter 11 to lock the shutter 11 at the closed position when the shutter 11 is at the closed position.

Incidentally, on the inner wall of the upper half 1 and the lower half 2 forming the cartridge 4 which is the inner peripheral side area that surrounds the chucking mechanism insertion openings 7 and 8, a plurality of circle shaped ribs 18 and a rectangular rib 19 are formed to project upwardly, as viewed in FIG. 1, by a predetermined distance and are arranged in the circumferential direction in alignment with a non-signal recorded portion 5a formed on the inner peripheral side of the disk 5. The interior spaces formed by the ribs 18 and 19 constitute inner peripheral side concave supporting portions 20, 21. Also, at the periphery of the disk 5, there are located arc-shaped ribs 23 which project to inwardly contact with the outer side wall of the upper half 1 and lower half 2 thereby to form a disk accommodation portion 22. A plurality of circular outer peripheral concave supporting portions 24 are also formed around the disk's periphery in a spot-facing fashion in alignment with the non-signal recorded portion 5b formed on the outer peripheral side of the disk 5.

The circular inner peripheral concave supporting portion 20 and the outer peripheral concave supporting portion 24 each hold circular disc supporting members 25 formed as shown in FIG. 4. The rectangular inner peripheral concave supporting portion 21 is engaged with a rectangular disk supporting member 26 formed as shown in FIG. 5. These disk supporting members 25 and 26 are each made of silicone rubber which has excellent elasticity. On the upper (as viewed in FIGS. A and 5A) disk supporting surfaces of the disk supporting members 25, 26, there is provided a sticking preventing portion 27 which is formed to have a rough surface that takes the form of very small concavities and convexities created by a craping process. The sticking preventing portion 27 is the rough surface taking the form of very small craped concavities and convexities, so that when the disk 5 is loaded on the disk supporting surfaces of the disk supporting members 25 and 26, the disk supporting surfaces and the surface of the disk 5 are prevented from contacting with one another very closely.

The disk supporting members 25 and 26, respectively comprise peripheral walls 25a, 26a downwardly extended from their peripheral edges in the perpendicular direction and with an adhesive agent filling the concave portions 25b, 26b formed on the rear surfaces thereof in the form of substantially a cup. The peripheral walls 25a and 26a form around their inner and outer peripheral portions a plurality of grooves 25c, 26c through which the extra adhesive agent filled in the concave portions 25b, 26b are escaped. The thus formed disk supporting members 25, 26 are formed to be slightly thicker than the depths of the inner peripheral concave supporting portion 20 and the outer peripheral concave supporting portion 24 and are slightly smaller in size. Thus, when they are engaged with the supporting portions 20, 24, the upper surfaces, that is, the disk supporting surfaces thereof protrude from the supporting portions 20, 24 and very small spacings are formed between the peripheral wall 25a, 26a and the inner peripheral surfaces of the supporting portions.

Figure 7:
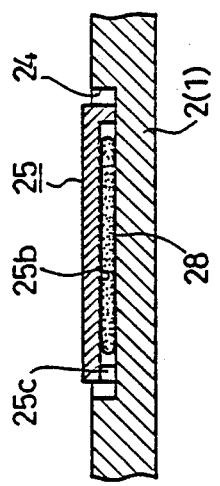
FIG. 7 is a cross-sectional view illustrating that the disk supporting member is located in an outer peripheral side concave supporting portion.
Figure 6:
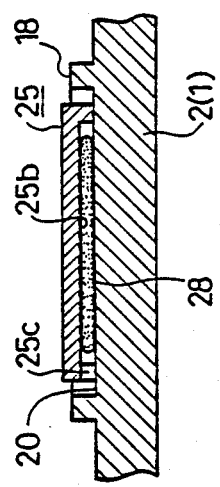
FIG. 6 is a cross-sectional view illustrating that the disk supporting member is located in an inner peripheral side concave supporting portion.

The disk supporting members 25, 26 are respectively inserted into the inner peripheral concave supporting portions 20, 21 with their concave portions 25b, 26b filled with a silicone adhesive agent 28 and then bonded to the bottoms of the supporting portions 20, 21 by the adhesive agent 28 as best shown in FIG. 6. Also, the disk supporting member 25 is inserted into the outer peripheral concave supporting portions 24 with its concave portion 25b filled with the silicone adhesive agent 28 and is then bonded to the buttom of the supporting portion 24 by the adhesive agent 28 as shown in FIG. 7. Since the disk supporting members 25, 26 have the plurality of grooves 25c, 26c to allow the escape of the extra bounding agent formed over the inner and outer peripheral portions of the peripheral walls 25a, 26a thereof, excess adhesive agent can be absorbed by the grooves 25c, 26c. Further, since the disk supporting members 25, 26 are smaller than the respective concave supporting portions 20, 21 and 24 in size, the spacings between the disk supporting members and the concave supporting portions 20, 21, 24 can absorb the adhesive agent 28 that cannot be absorbed fully by the grooves 25c, 26c, preventing the adhesive agent from invading the inner surface side of the cartridge 4. Thus, the disk or the like can be protected from smudges.

Since as described above the disk supporting members 25, 26 engaged into the respective concave supporting portions 20, 21 and 24 are made thicker than the depths of the supporting portions 20, 21 and 24, the upper disk supporting surfaces thereof are in the protruded condition as shown in FIG. 3. Further, the inner peripheral concave supporing portions 20, 21 are formed by protruding the frame-shaped ribs 18, 19 which protrude from the inner walls of the upper half 1 and the lower half 2. The outer peripheral concave supporting portion 24 is formed by partially boring the inner walls of the upper half 1 and the lower half 2 in a spot-facing manner. Thus, the heights from their bottom surfaces are made different so that the upper disk supporting surfaces of the disk supporting members 25, 26 of the same thickness are higher on the inner periphery side area of the disk 5 than they are on the outer periphery side area. The disk 5 accommodated in the cartridge 4 is therefore supported by the inner peripheral disk supporting members 25, 26 as shown in FIG. 3 upon non-use where it is not chucked on the disk table of the recording and/or reproducing apparatus. When the disk 5 is warped, the outer peripheral disk supporting member 25 supports the outer peripheral surface of the disk, suppressing the disk from being warped.

Figure 10:
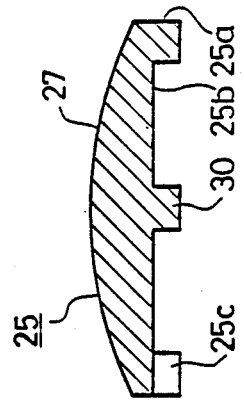
FIG. 10 is a cross-sectional view illustrating a yet further example of the disk supporting member.
Figure 9:
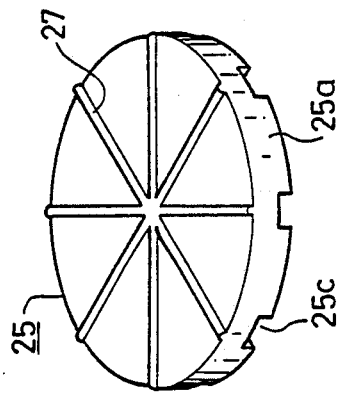
FIG. 9 is a perspective view illustrating a further example of the disk supporting member.

While the sticking preventing portion 27 is a rough surface formed on the upper disk supporting surfaces of the disk supporting members 25, 26 in this embodiment, any sticking preventing portion 27 may be employed if it can prevent the disk supporting surface and the disk 5 from closely contacting each other to form, for example, a sucking disk construction between the surface of the disk 5 and the disk supporting surface when the disk 5 is loaded on the disk supporting surface and the disk supporting surface is bent. As, for example, shown in FIG. 8, the sticking preventing portion 27 can be formed by radially forming grooves from the center to the upper disk supporting surface of the disk supporting member 25 to thereby prevent the disk supporting surface and the disk 5 from closely contacting each other. Alternatively, as shown in FIG. 9, a similar sticking preventing portion 27 can be formed by radially forming protruding portions from the center to the upper disk supporting surface of the disk supporting member 25. It is also possible to form the above-mentioned grooves and protruded portions in a sprial shape. Further, as shown in FIG. 10, the central portion of the upper disk supporting surface of the disk supporting member 25 can be made relatively thick and a supporting leg 30 is projects from the lower surface at the position corresponding to the thickest portion of the disk supporting member 25 to thereby form a sticking preventing portion 27 that can prevent the disk supporting surface from being warped when the disk 5 is loaded onto the disk supporting surface.

Further embodiments of the disk supporting member will be described next with reference to FIGS. 11 to 17.

Figure 12A:
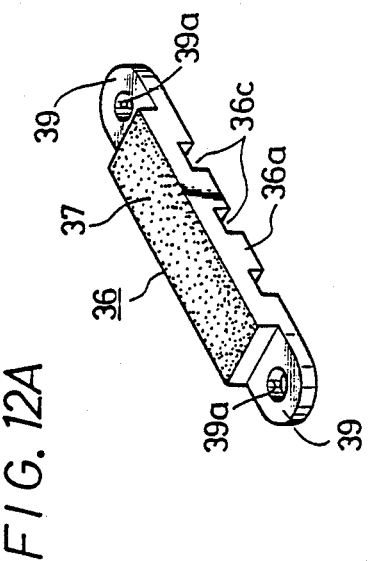
FIG. 12A is an upper perspective view thereof and FIG. 12B is a lower perspective view thereof.
Figure 12B:
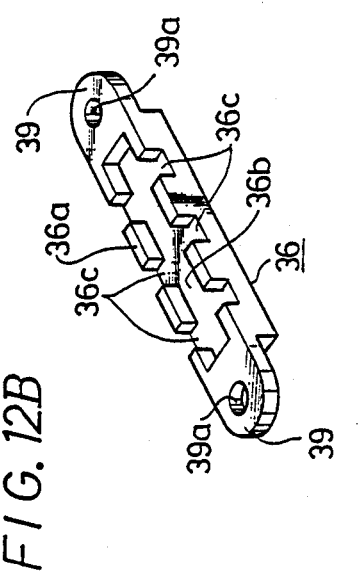
Figure 11A:
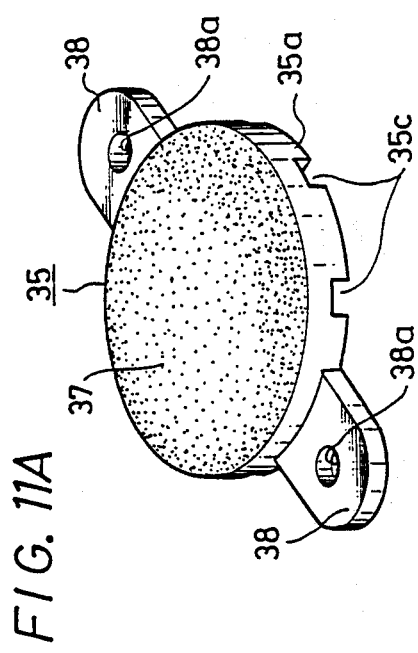
FIG. 11A is an upper perspective view thereof and FIG. 11B is a lower perspective view thereof.
Figure 11B:
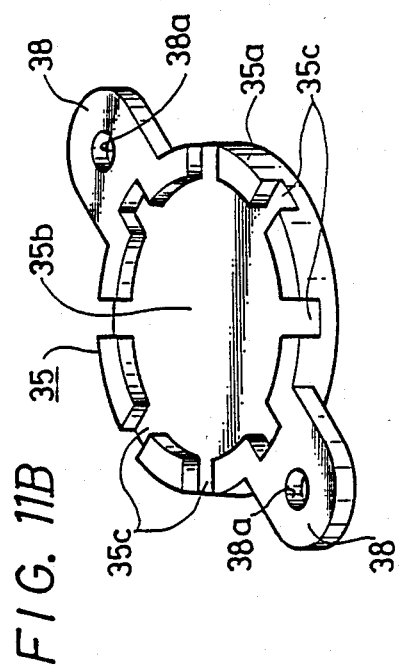
Figure 15:
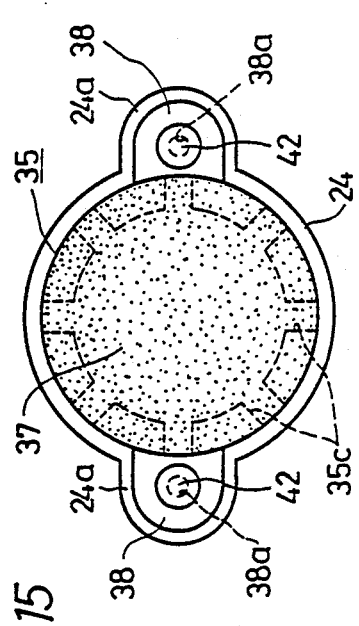
FIG. 15 is a plan view illustrating that the disk supporting member shown in FIG. 11 is mounted on the outer peripheral side concave supporting portion.
Figure 16:
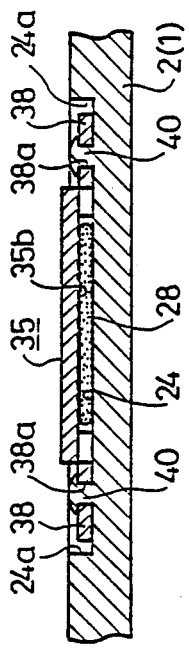
FIG. 16 is a cross-sectional side view of FIG. 15

FIG. 11 illustrates a circular disk supporting member 35 that is engaged with the circular, inner peripheral, concave supporting portion 20 and the outer peripheral, concave, supporting portion 24 of the upper half 1 and the lower half 2, similarly to the afore-mentioned embodiment. FIG. 12 illustrates a rectangular disk supporting member 36 that is engaged with the rectangular inner peripheral concave supporting member 21. These disk supporting members 35 and 36 are each made of silicone rubber, and on the upper disk supporting surfaces thereof these are formed sticking preventing portions 37 by rough surfaces that take the form of very small concavities and convexities, similarly to the aforesaid embodiment.

A pair of horizontal leg portions 38 and 39 are respectively formed integral with the peripheral surfaces of these disk supporting members, and attaching openings 38a, 39a are respectively bored through these horizontal leg portions 38 and 39. As to the circular disk supporting member 35, the horizontal leg portions 38 are formed opposite to each other in its diametrical direction, while as to the rectangular disk supporting member 36, the horizontal leg portions are formed opposite to each other in its longitudinal direction.

Similarly to the aforesaid embodiment, peripheral walls 35a, 36a are extended downward from the lower peripheries of these disk supporting members 35, 36 in the vertical direction thereby to form concave portions 35b, 36b into which the adhesive agent is filled. A plurality of grooves 35c, 36c are formed over the inner and outer peripheries of the peripheral walls 35a, 36a, thus letting the extra adhesive agent escape therethrough. The horizontal leg portions 38, 39 have thicknesses of substantially one-half of those of the peripheral walls 35a, 36a and are formed integral therewith to be flush with the lower surfaces of the peripheral walls 35a, 36a.

On the respective concave supporting portions 20, 21 and 24 that are engaged with the thus constructed disk supporting members 35, 36, there are implanted a pair of pins 40, 41 and 42 which are inserted through the attaching openings 38a, 39a of the horizontal leg portions 38, 39.

Figure 17:
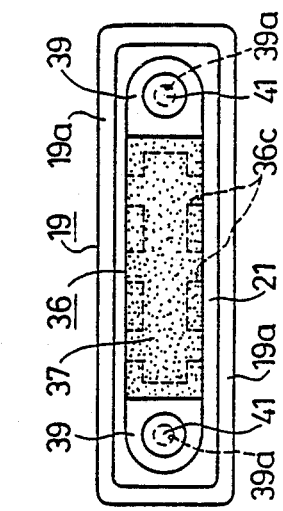
FIG. 17 is a plan view illustrating that the disk supporting member shown in FIG. 12 is located on the inner peripheral side concave supporting portion.
Figure 13:
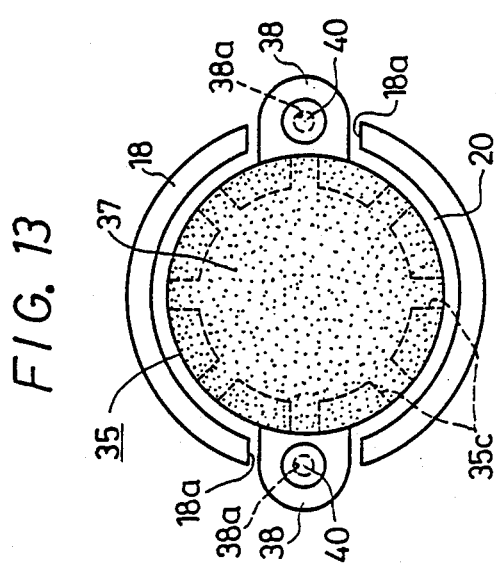
FIG. 13 is a plan view illustrating that the disk supporting member shown in FIG. 11 is mounted on the inner peripheral side concave supporting portion.
Figure 14:
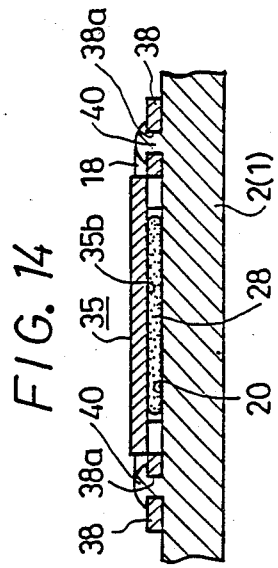
FIG. 14 is a cross-sectional side view of FIG. 13.

That is, as shown in FIGS. 13 and 14, in the circular inner peripheral concave supporting portion 20, the circular frame-shaped rib 18 which forms the same has a pair of notches 18a formed in its diametrical direction and into which the horizontal leg portions 38 of the disk supporting member 35 can be inserted. The pins 40 are implanted at approximately the centers of both notches 18a. While, in the rectangular inner concave supporting portion 21, as shown in FIG. 17, its rectangular frame-shaped rib 19 which forms the same is provided at both longitudinal ends with elongated portions 19a into which the horizontal leg portions 39 of the disk supporting member 36 are inserted. The pins 41 are implanted on both the elongated portions 19a. On the other hand, in the circular outer peripheral concave supporting portion 24, a pair of concave portions 24a are formed opposite to each other along the diametrical direction of the circular spot-facing portion and into which the pair of horizontal leg portions 38 of the disk supporting member 35 are inserted. The pins 42 are protrusively formed on both the concave portions 24a.

The circular disk supporting members 35 are respectively inserted into the inner peripheral concave supporting portions 20 and the outer peripheral concave supporting portions 24. At the same time, the pins 40 and 42 are inserted into the attaching openings 38a of the horizontal leg portions 38 and the top portions of the pins 40 and 42 are calked. The rectangular disk supporting member 36 is engaged into the rectangular inner peripheral concave supporting portion 21. At the same time, the pins 41 are inserted into the attaching openings 39a of the horizontal leg portions 39 and then the top portions of the pins 41 are calked, whereby the disk supporting members 35, 36 are fixed to the concave supporting portions 20, 21 and 24, respectively.

Also in the thus formed embodiment, the upper disk supporting surfaces of the respective disk supporting members 35, 36 are protruded from the respective concave supporting portions 20, 21 and 24, while the heights thereof are high on the inner peripheral side and low on the outer peripheral side.

The disk supporting members 35, 36 may be respectively bonded to the concave supporting portions 20, 21 and 24 by a silicone adhesive agent 28 filled into the concave portions 35a, 36a, similarly to the aforesaid embodiment. In this case, some of the excess adhesive agent can be absorbed by the grooves 35c, 36c, while the remaining excess adhesive agent 28 can be absorbed by the spacings formed within the concave supporting portions 20, 21 and 24.

In accordance with this embodiment, the disk supporting members 35, 36 can be respectively fixed to the supporting portions by three ways such as calking the pins 40, 41 and 42, bonding using the adhesive agent 28 and a combination of the calking and bonding. Particularly when calking by means of the pins 40, 41 and 42 and bonding by means of adhesive agent 28 are both employed, the disk supporting members 35, 36 can be respectively fixed to the concave supporting portions 20, 21 and 24 more positively so that the disk 5 can be supported more stably.

Figure 8:
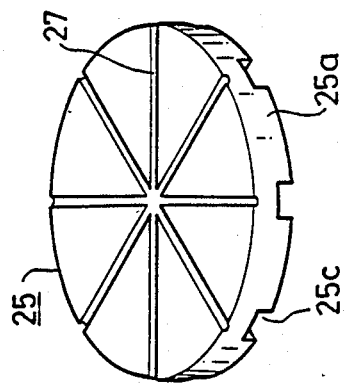
FIG. 8 is a perspective view illustrating another example of the disk supporting member.

In this embodiment, the sticking preventing portion 37 of each of the disk supporting members 35, 36 can be formed the shapes and constructions shown in FIGS. 8 to 10. Also, the horizontal leg portions 38, 39 are not limited to pairs but may be more than three. Furthermore, if they are formed over the whole periphery, it is also possible to fix the disk supporting members to the supporting portions by calking at more than three positions.

According to this embodiment, as described above, since the disk supporting members 35, 36 are fixed to the concave supporting portions 20, 21 and 24 by calking the pins 40, 41 and 42, substantially no secular variation is produced and hence, they can be held in the fixed state stably over a sufficient period of time. Particularly when they are fixed only by calking, the accuracy of the height of the disk supporting surface can be maintained so that the disk 5 can be supported evenly and stably.

It is needless to say that the present invention is not limited to the aforesaid embodiments but can take various modifications without departing from the gist of the present invention.

According to the present invention, upon non-use, the disk accommodated in the cartridge is stably supported by the supporting member of excellent flexibility and the sticking preventing portion is provided on the disk supporting surface of this supporting member. Thus, even if the supporting member is bent by the application of the weight of the disk, the sticking can be prevented by the sticking preventing portion and the disk supported by the supporting member can be prevented from sticking to the supporting member. Therefore, it is possible to provide a disk cartridge which can make the disk begin to rotate smoothly when the cartridge is loaded on and the disk is rotated by the recording and/or reproducing apparatus.

Further, since the supporting member is positively and stably fixed to the inner surface of the cartridge half, the disk can be kept safe during a sufficient period of time. In addition, it is possible to provide a cartridge which can prevent the disk from being damaged when the disk is carried.

I claim:

1. A disk cartridge in which a recording and reproducing disk is accommodated to be rotatable comprising:
   a pair of cartridge halves having concave supporting portions formed on their inner surfaces at positions aligned with non-signal recorded positions on the inner and outer peripheries of said disk; and
   disk supporting members mounted in said concave supporting portions, said supporting members being provided with disk supporting surfaces, each such disk supporting surface having a disk sticking preventing portion, said supporting members supporting said disk when said disk is not in use and wherein said supporting members are sized in relation to the dimensions of the concave supporting portions so that they slightly project from said concave supporting portions and said supporting members are provided on their sides opposite to their disk supporting surfaces with concave portions and an adhesive agent is deposited into said concave portions to thereby fix said supporting members to said supporting portions.

2. A disk cartridge according to claim 1, characterized in that said supporting members have grooves extending from the interior of their concave portions to the outside to provide an escape for excess adhesive agent.

3. A disk cartridge in which a recording and reproducing disk is accommodated to be rotatable comprising:
   a pair of cartridge halves having concave supporting portions formed on their inner surfaces at positions aligned with non-signal recorded positions on the inner and outer peripheries of said disk; and
   disk supporting members mounted in said concave supporting portions, said supporting members being provided with disk supporting surfaces, each such disk supporting surface having a disk sticking preventing portion, said supporting members supporting said disk when said disk is not in use and wherein said supporting members are provided with a pair of leg portions having attaching openings, a pair of pins formed on said supporting portions are inserted into said attaching openings and the upper ends of said pins are caulked to thereby fix said supporting members to said supporting portions.

4. A disk cartridge in which a recording and reproducing disk is accommodated to be rotatable comprising:
   a pair of cartridge halves having concave supporting portions formed on their inner surfaces at positions aligned with non-signal recorded positions on the inner and outer peripheries of said disk; and
   disk supporting members mounted in said concave supporting portions, said supporting members being provided with disk supporting surfaces, each such disk supporting surface having a disk sticking preventing portion, said supporting members supporting said disk when said disk is not in use and wherein said disk sticking preventing portions are made to have rough surfaces.

5. A disk cartridge in which a recording and reproducing disk is accommodated to be rotatable comprising:
   a pair of cartridge halves having concave supporting portions formed on their inner surfaces at positions aligned with non-signal recorded positions on the inner and outer peripheries of said disk; and disk supporting members mounted in said concave supporting portions, said supporting members being provided with disk supporting surfaces, each such disk supporting surface having a disk sticking preventing portion, said supporting members supporting said disk when said disk is not in use and wherein said disk sticking preventing portions are radial-shaped grooves.

6. A disk cartridge in which a recording and reproducing disk is accommodated to be rotatable comprising:

a pair of cartridge halves having concave supporting portions formed on their inner surfaces at positions aligned with non-signal recorded positions on the inner and outer peripheries of said disk; and disk supporting members mounted in said concave supporting portions, said supporting members being provided with disk supporting surfaces, each such disk supporting surface having a disk sticking preventing portion, said supporting members supporting said disk when said disk is not in use and wherein said disk sticking preventing portions are radial-shaped ribs.

7. A disk cartridge in which a recording and reproducing disk is accommodated to be rotatable comprising:

a pair of cartridge halves having concave supporting portions formed on their inner surfaces at positions aligned with non-signal recorded positions on the inner and outer peripheries of said disk; and disk supporting members mounted in said concave supporting portions, said supporting members being provided with disk supporting surfaces, each such disk supporting surface having a disk sticking preventing portion, said supporting members supporting said disk when said disk is not in use and wherein said disk sticking preventing portions are projected portions of which the central portions are large in thickness as compared with the peripheral portions thereof.

8. A disk cartridge in which a recording and reproducing disk is accommodated to be rotatable comprising:

a pair of cartridge halves having concave supporting portions formed on their inner surfaces at positions aligned with non-signal recorded positions on the inner and outer peripheries of said disk; and disk supporting members mounted in said concave supporting portions, said supporting members being provided with disk supporting surfaces, each such disk supporting surface having a disk sticking preventing portion, said supporting members supporting said disk when said disk is not in use and wherein said supporting members are provided on their sides opposite to their disk supporting surfaces with concave portions, and an adhesive agent is deposited into said concave portions so as to fix said supporting members to said supporting portions.

9. A disk cartridge according to claim 8, characterized in that said supporting members have grooves extending from the interior of said concave portions to the outside to provide an escape for excess adhesive agent.

* * * * *